W. BROWN.
Churn.
No. 20,189.  Patented May 11, 1858.
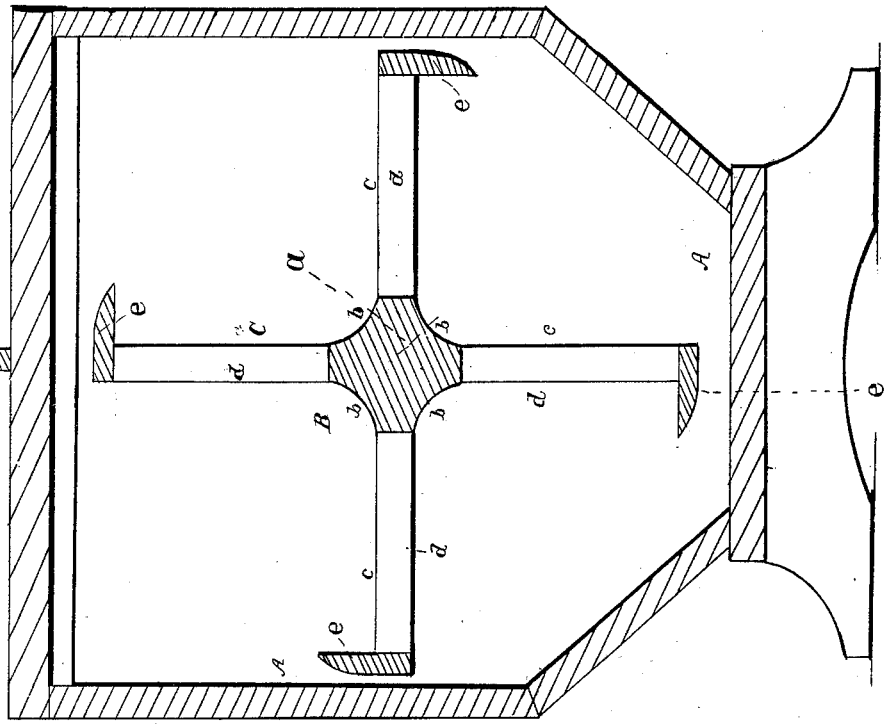
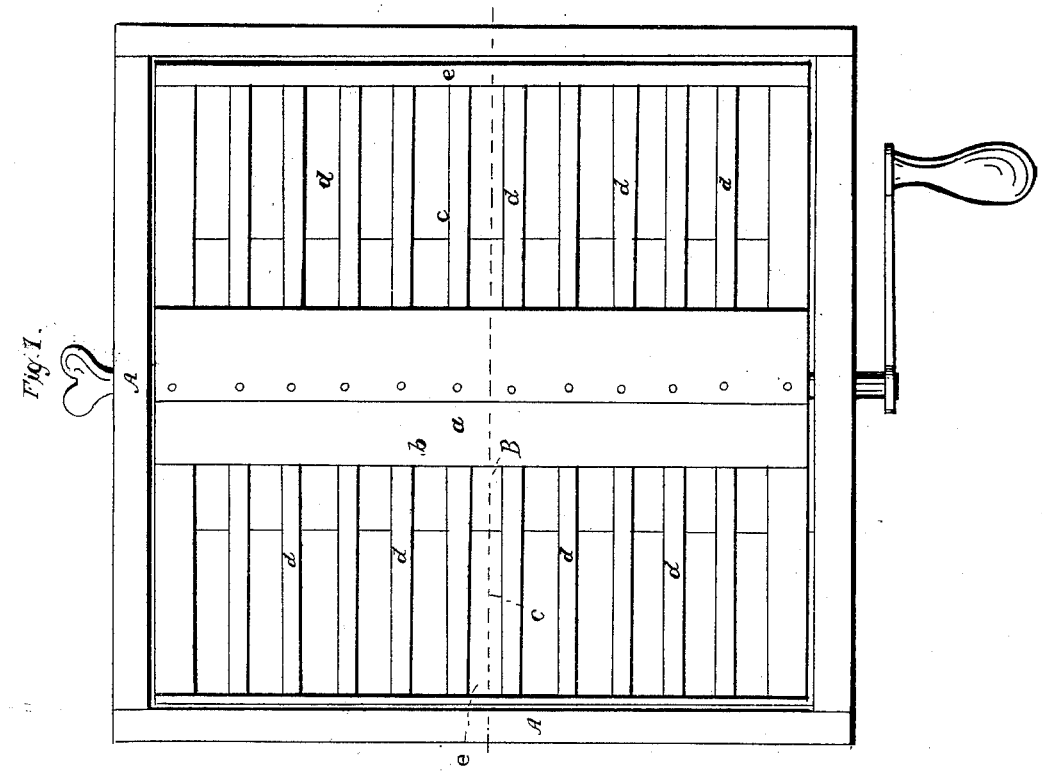

UNITED STATES PATENT OFFICE.

W. BROWN, OF DUNCANNON, PENNSYLVANIA.

CHURN.

Specification of Letters Patent No. 20,189, dated May 11, 1858.

*To all whom it may concern:*

Be it known that I, WM. BROWN, of Duncannon, in the county of Perry and State of Pennsylvania, have invented a new and useful Improvement in Churns; and I do hereby declare that the following is a full, clear, and exact description of the same, reference being had to the accompanying drawings, forming a part of this specification, in which—

Figure 1, is a plan or top view of a churn constructed with my improvements. Fig. 2, is a vertical transverse section of the same.

Similar letters of reference in each of the several figures indicate corresponding parts.

My invention consists in the combination, in a dasher, of a series of radial, slatted agitating and separating wings, a series of gathering and retaining flanges, and a solid hub, which forms the butter into a roll; all as presently set forth.

To enable others skilled in the art to make and use my invention, I will proceed to describe its construction and operation.

A, in the accompanying drawing represents the churn box, and B, the dasher, hung so as to revolve in the same in the usual manner. The dasher B, has a solid hub $a$, which is made with each of its sides concave as shown at $b, b, b, b$, so as to form the butter into a roll; from this hub, a series of radial wings $c, c, c, c$, project as shown. These wings are formed of transverse slats $d, d$, so that the cream shall have a free escape through while the butter is retained upon them. The outer ends of the slats are bound by means of flanges $e, e, e, e$; said flanges standing at right angles to the slats and projecting beyond their operating surface some distance as shown. The office of these slats is to collect the particles of butter as fast as formed and retain them upon the slats; they also serve for preventing the roll of butter from coming in contact with the sides of the churn box as the dasher revolves, thus insuring a perfect collection of the butter into a neat roll through the aid of the solid hub, which gives to the roll of butter a compact form as fast as it is thrown upon the same or in contact with its concave sides.

With the above described churn dasher the agitation is accomplished by giving the dasher a continuous rotating motion in the direction of the arrow, and as fast as the butter is produced the flanges collect and retain it upon the slatted wings until the wings arise out of the cream and assume a position which compels it to fall into the concaves of the solid hub. As the butter rolls into the concaves of the solid hub, the milk escapes between the slats of the wings. When the last wing which lifted the butter out of the milk again enters the milk and assumes a position opposite to that which is necessary to have the butter roll into the concaves of the hub, the collected butter, by its gravity, rolls back into the cream to be caught up by the succeeding wing, and have whatever other particles of butter which may have been gathered by said wing added to it; thus the operation continues until the butter is perfectly made, worked and collected into a roll.

The churn dasher might be constructed so as to accomplish, in a measure, the above operations, by placing the slats of the wings parallel with the hub instead of at right angles to the same, and not have the hub concave on its sides; but I think it best to place the slats at right angles to the hub, because when the slats are thus placed the butter rolls to the center with less obstruction, and when the hub is concave the butter is formed into a more perfect roll.

What I claim as my invention and desire to secure by Letters Patent, is—

The combination in a churn dasher, of a series of slatted agitating and separating wings $c, c, c, c$, a series of gathering and retaining flanges $e, e, e, e$, and a solid concaved roll forming hub $a$, all substantially as and for the purposes set forth.

The above specification of my improved churn signed by me this 13th day of April 1858.

WM. BROWN.

Witnesses:
G. YORKE ATLEE,
H. H. YOUNG.